United States Patent [19]

Egawa et al.

[11] Patent Number: 4,544,254
[45] Date of Patent: Oct. 1, 1985

[54] CAMERA WITH A DISPLAY DEVICE FOR DISPLAYING BOTH OBJECT DISTANCE INFORMATIONS AND COUPLING RANGE INFORMATIONS

[75] Inventors: Akira Egawa; Ryuji Tokuda, both of Tokyo, Japan

[73] Assignee: Canon Kabushiki Kaisha, Tokyo, Japan

[21] Appl. No.: 537,632

[22] Filed: Sep. 30, 1983

[30] Foreign Application Priority Data

Oct. 4, 1982 [JP] Japan .................... 57-174212

[51] Int. Cl.⁴ .................. G03B 3/10; G03B 15/05; G03B 17/38
[52] U.S. Cl. .................. 354/403; 354/127.12; 354/127.13; 354/268
[58] Field of Search .................. 354/400–403, 354/409, 418, 421, 423, 469, 474, 475, 127.1, 127.11–127.13, 195.13, 289.1, 268

[56] References Cited

U.S. PATENT DOCUMENTS

| | | | |
|---|---|---|---|
| 3,273,478 | 9/1966 | Kinder | 354/127.12 |
| 3,688,664 | 9/1972 | Mashimo | 354/127.12 X |
| 3,714,872 | 2/1973 | Mashimo et al. | 354/418 |
| 4,258,991 | 3/1981 | Kuraishi | 354/127.12 |
| 4,322,141 | 3/1982 | Tominaga et al. | 354/409 X |

*Primary Examiner*—William B. Perkey
*Attorney, Agent, or Firm*—Toren, McGeady, Stanger, Goldberg & Kiel

[57] ABSTRACT

A camera provided with a display device that displays changing of the coupling range of a strobe as the amount of charge stored on a main capacitor in the strobe changes, that is, changing of the target area for a proper exposure in stroboscopic photography, and displays an object distance obtained by the auto-focus means in a combined form.

20 Claims, 8 Drawing Figures

CAMERA WITH A DISPLAY DEVICE FOR DISPLAYING BOTH OBJECT DISTANCE INFORMATIONS AND COUPLING RANGE INFORMATIONS

BACKGROUND OF THE INVENTION

1. Field of the Invention

This invention relates to exposure information display devices for use in cameras, and more particularly to such display device usable for displaying both the amount of charge in the flash unit and the object distance in a combined form.

2. Description of the Prior Art

In the art of leaf shutter cameras, cameras with an automatic focusing device, strobe device and automatic exposure device have been more and more popular, and this trend has recently become more general. Among cameras on market, there is known one type of camera which displays whether an object to be photographed lies in a near or a far distance by using a distance information measured by an automatic focusing device, and in a stroboscopic exposure mode, the indication that the object is beyond the coupling range of the strobe, or at a farther distance than that which gives a proper exposure for the object in the flash mode is changed from a continuous illumination to a blinking illumination, thus warning the photographer. In the camera of above type, however, because the exposure operation is hindered from starting until the main capacitor of the strobe is fully charged, the aforesaid coupling range is retained constant. This constitutes a drawback.

Another type of camera has been put on the market by Canon Kabushiki Kaisha which enables emission of stroboscopic light even before the main capacitor is fully charged, by providing the level for determining the completion of charging of the main capacitor at a relatively low value with a small capacitance of an electrical power source or battery to minimize the size of the strobe device. In the above camera, from the moment at which the voltage on the main capacitor has reached a level for emission of light to the moment at which the main capacitor will be fully charged, the amount of charge on the main capacitor gradually rises along the lapse of time, leading to gradual increase of the amount of flash light to be emitted when it is fired.

There is also known a camera in which the distance information preset manually in the distance adjusting ring of a photographic lens, the film speed information and the information of the amount of charge on the main capacitor of the strobe are combined to control operation of the diaphragm in the objective lens so as to derive a proper exposure. In this type of camera, despite the amount of charge on the main capacitor changes with time, it is made possible to always obtain a proper exposure. In the event the proper exposure cannot be derived even with the diaphragm of the objective lens at full open, the camera is automatically hindered from entering the exposure making state. Since the camera, however, has no auto-focus function, the display of the object distance and the display of indicating whether or not the object falls within the coupling range take completely different forms.

SUMMARY OF THE INVENTION

Therefore, the object of the present invention is to provide a display device for a camera, which displays the charge completion with a guide number corresponding to the distance to an object. The display device according to the present invention is based on the relation between the guide numbers of a flash device which vary depending on the charge state of a main capacitor, in particular, and the distance to an object, and is characterized in that both the display of the distance to an object and the display of the charge completion of a main capacitor of a flash device are performed by the device, and in cases where the object is present at a relatively short distance the display of the charge completion is performed with a relatively low guide number, thus considerably shortening the waiting time for the charge completion in a short distance photography.

DETAILED DESCRIPTION OF THE PREFERRED EMBODIMENTS

In the following, the present invention will be described in more detail with reference to the accompanying drawings.

Figure 1:
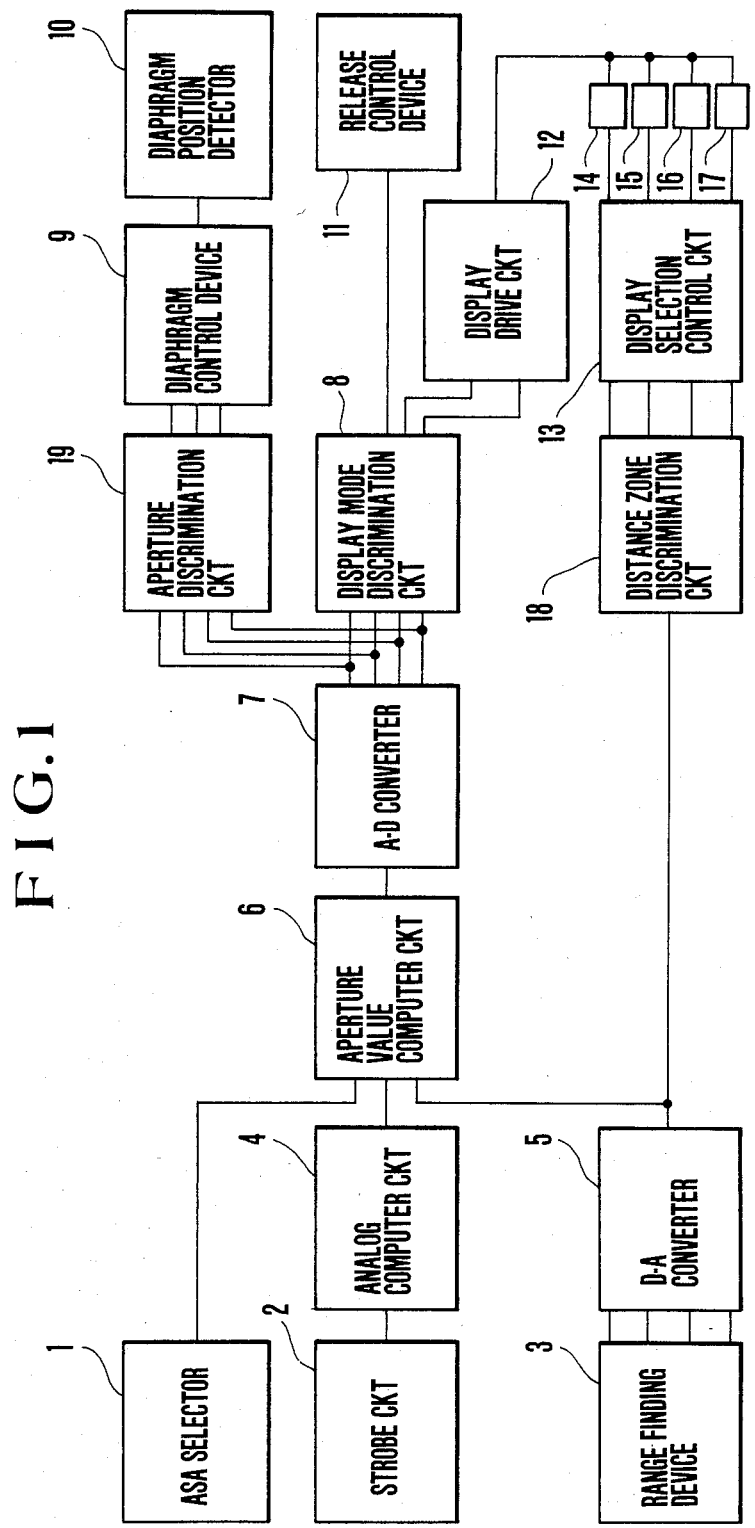
FIG. 1 is a block circuit diagram illustrating an embodiment of a display device for camera according to the present invention.

FIG. 1 is a block electrical circuit diagram of an embodiment of the display device for a camera according to the present invention. In the drawing, an ASA selector 1 responsive to the preset value of film speed in ASA after logarithmic transformation (hereinafter referred to as "log transformation") produces an output in the form of an analog value. A strobe circuit 2 is able to fire from where the voltage stored on the main condenser is relatively low, providing a relatively wide range of guide number (hereinafter called "GNo").

Therefrom is produced the voltage of the main condenser which is then subjected to log transformation by an analog computer circuit 4 producing an output proportional to the logarithm of the GNo at ASA 100. A distance measuring device 3 is able to perform the so-called premeasurement of distance prior to the focusing drive of the objective lens regardless of whether or not the ambient light is available and produces an output proportional to the distance from the camera to the object in digital form. This digital value is log-transformed to an analog value by a D-A converter circuit 5. In an aperture computer circuit 6, the ASA value from the ASA selector 1, the GNo at ASA 100 from the analog computer circuit 4 and the analog distance information from the D-A converter circuit 5 are computed to derive a proper aperture value. On this computation, explanation will be later given in connection with FIG.

2. This analog aperture value is changed to a digital value by an A-D converter circuit 7 which is then compared with the maximum possible aperture opening by a display mode discrimination circuit 8, thereupon the photographic situations are classified to a first case where an under-exposure will result so that the camera is impossible to operate, a second case where an actual under-exposure at the full open aperture is within one step of the diaphragm so that the camera is allowed to operate, and a third case where a proper exposure will be obtained. In the first case, the display mode discrimination circuit 8 produces an output signal for hindering actuation of a camera release as it is applied to a release control device 11. Further, since no display mode signal is given to a display drive circuit 12, all display elements 14 to 17 are not driven to operate, being rendered inoperative. When setting of the diaphragm even at the full open aperture will result in not larger an under-exposure by one step than the proper one, the display mode discrimination circuit 8 produces an output signal representing a blinking mode of display which is then applied to the display drive circuit 12, thereby the display elements 14 to 17 are driven to blink in warning. When the exposure is so proper that the normal operation is possible, the display mode discrimination circuit 8 produces another output signal representing the continuously lighting mode of display which is then applied to the display drive circuit 12, thereby the display elements 14 to 17 are lighted on continuously. About the driving operation in these display modes will be made explanation later in connection with FIG. 3A. These display elements 14 to 17 are in one-to-one corresponding relation to four zones of a range of object distances from infinity to a close one. As will be described later, upon selection of one of the four display elements, the corresponding zone in which the object takes its position is displayed. In this embodiment, the flash illumination on an infinitely distant object is taken as impossible, and, therefore when the object is found to lie in the infinite distance zone, the displaying and releasing of the shutter are both prohibited so that when in flash exposure mode, the display element 14 is out of use. Of course it would be otherwise made possible in view of providing a room that though it is impossible at the infinite object distance literally to assure making of a proper exposure even with full charging of the main capacitor of the strobe, since the infinite zone includes finite distances, the photographer is permitted to dare to make an exposure, that particularly with the case of infinity only, when at full charging, the display takes place in blinking form, and release prohibition is not laid. Here turning to the distance D-A converter circuit 5, its analog distance information is routed to a distance zone discrimination circuit 18 which produces an output signal representing the corresponding distance zone to the measured distance. Responsive to this output signal, a display element selection control circuit 13 chooses the corresponding one of the display elements 14 to 17 for displaying the measured distance in the form of the zone. Therefore, the one of the display elements 14 to 17 which is chosen by the control circuit 13 is rendered operative in the selected display mode by the display drive circuit 12, thereby it being made possible to inform the photographer of what lighting situation is to take place when in flash photography depending on the voltage stored on the strobe by using the distance display device. Also the digital output of the analog-to-digital converter circuit 7 which represents a proper exposure value, i.e., aperture value, is transformed to a diaphragm control signal by an aperture stop discrimination circuit 19. Then, as will be later described in connection with FIG. 6, pulses coming from a diaphragm position detecting device 10 are counted by the aperture control circuit 9 to compare with the aperture control signal of the diaphragm stop discrimination circuit 19, thereby the size of aperture opening of the diaphragm is adjusted in a manner known to those skilled in the art.

Figure 2:
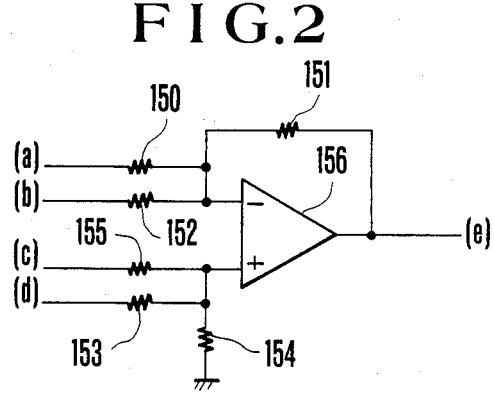
FIG. 2 is an electrical circuit diagram of the aperture computer 6 of FIG. 1.

FIG. 2 illustrates a practical example of the aperture value computer circuit 6 of FIG. 1. In general, the aperture Ap, distance D, film speed ASA and guide number $GNo_{100}$ at ASA 100 hold the following relationship:

$$Ap = [GNo_{100} \times (ASA/100)^{\frac{1}{2}}]/D \tag{1}$$

By taking the logarithm of both sides of the above equation, we obtain $$Apv = GNo_{100}v + \tfrac{1}{2}ASAv - Dv - \tfrac{1}{2}K \tag{2}$$

where $Apv = \log Ap$; $GNo_{100}v = \log GNo_{100}$; $ASAv = \log ASA$; $Dv = \log D$; and $K = \log 100$.

Applied to an inlet (c) is a voltage proportional to the $GNo_{100}v$, to another inlet (d) a voltage proportional to the $ASAv$, to another inlet (a) a voltage proportional to the $Dv$ and to another inlet (b) a voltage proportional to the K. Since the resistance value of resistors 150, 151, 154 and 155 are preadjusted to R and that of resistors 152 and 153 to 2R, an operational amplifier 156 performs analog computation based on the formula (2), producing an output in the form of a voltage proportional to the Apv at an outlet (e).

Figure 3A:
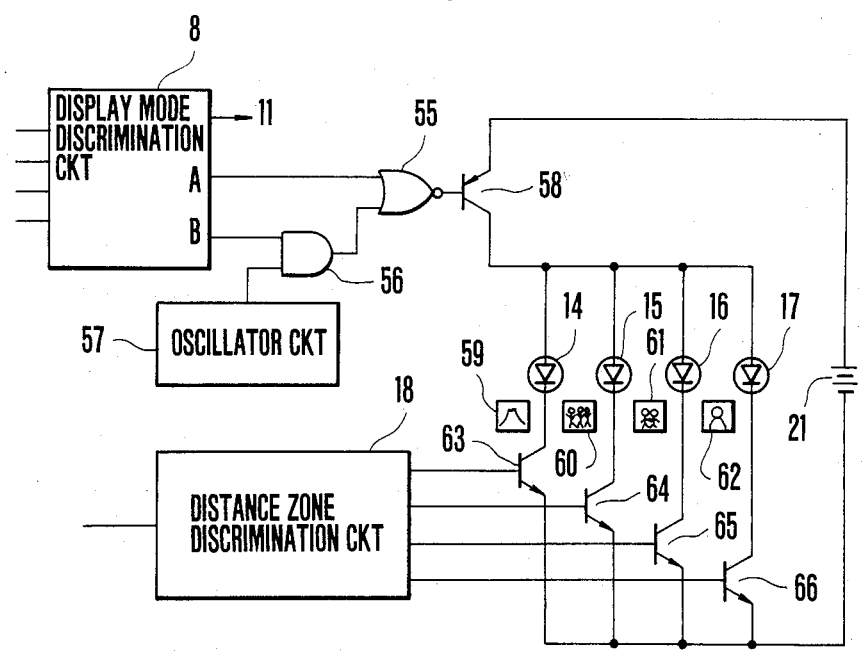
FIG. 3A is an electrical circuit diagram illustrating the concrete structure of the display circuit of FIG. 1.
Figure 3B:
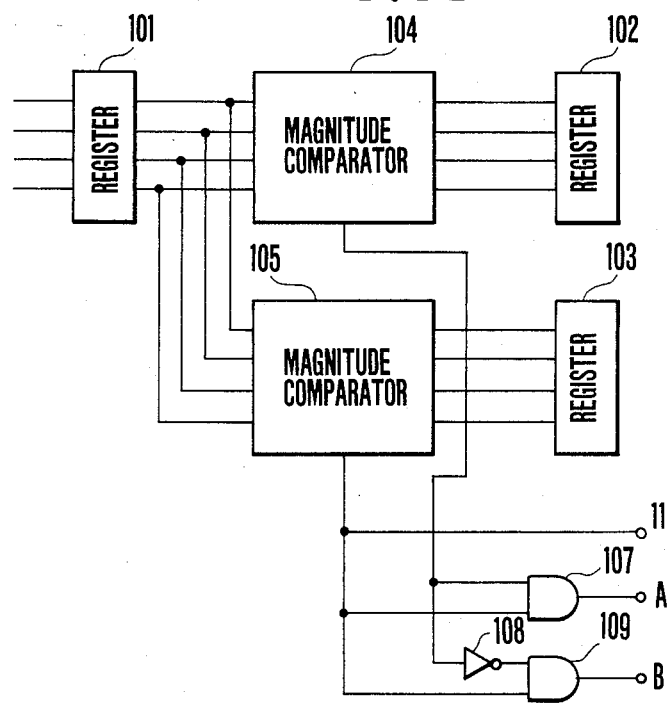
FIG. 3B is an electrical circuit diagram illustrating the concrete structure of the display mode discrimination circuit 8.

FIG. 3A illustrates a practical example of construction of the dispaly circuit as comprising the display mode discrimination circuit 8, display drive circuit 12, display control circuit 13, display elements 14 to 17 and distance zone discrimination circuit 18, and FIG. 3B illustrates a practical example of construction of constituent elements of the display mode discrimination circuit 8.

The analog distance information is discriminated by the distance zone discrimination circuit 18 to find out what distance zone it relates to. By the output of this discrimination circuit 18 the corresponding one of the display elements 14 to 17 made up of LEDs to the discriminated distance zone is rendered ready to light on as the one of transistors 63 to 66 constituting the display selection control circuit 13 which is connected to that display element is turned on.

An NOR gate 55, an AND gate 56, an oscillator circuit 57 and a transistor 58 constitute the display drive circuit 12. The detail of the display mode discrimination circuit 8 is illustrated in FIG. 3B, where 101 is a first register for latching the signal obtained by the A-D conversion of the output of the aperture value computer circuit 6 through the circuit 7; 102 is a second register in which the signal obtained by the A-D conversion of the aperture value at full open of the objective lens; 103 is a third register for latching a larger aperture value by one step than the full open aperture value of the objective lens after having been A-D converted; 104 is a magnitude comparator for comparing the magnitudes of the signals from the registers 101 and 102 upon detection of the fact that the aperture value latched on the register 101 is smaller than or equal to that latched on the register 102 to produce a signal of "H" level at the output thereof; 105 is a second magnitude comparator for comparing the magnitudes of the signals from the registers 101 and 103 with each other upon detection of the fact that the aperture value latched on the register 101 is smaller than or equal to that latched on the register 103 to produce a signal of "H" level at the output thereof; 107 is an AND gate for producing AND of them; 108 is an inverter; 109 is an AND gate for producing AND of the outputs of the inverter 108 and the magnitude comparator 105.

At outlets A and B there appears a display mode signal. When the outputs of the magnitude comparators 104 and 105 both are of "L" level, that is, when an under-exposure is to take place, the display mode discrimination circuit causes both of the outlets A and B to become "L" level. Also the signal of "L" level is output to the release device 11 to lock the release and prohibit photography. At this time, therefore, the output of AND circuit 56 takes "L" level, and, therefore, the output of NOR gate 55 takes "H" level, thereby the transistor 58 is turned off. Thus, any of the display elements 14 to 17 is not driven.

When the computed exposure value is not in excess of more than one step from the full open aperture so that the camera is allowed to operate, the first magnitude comparator 104 produces the output of "L" level, and the second magnitude comparator 105 produces the output of "H" level, causing the outlets A and B of the display mode discrimination circuit 8 to become "L" and "H" respectively. Then, the AND gate 56 produces an output in synchronism with the signal from the oscillator circuit 57 which is applied through the NOR gate 55 to turn on and off the transistor 58 repeatedly in synchronism with the pulses from the oscillator circuit 57. Therefore, the selected display element by the distance zone discrimination circuit 18 is driven to blink.

Alternatively when a proper exposure is to be obtained, the outputs of the magnitude comparators 104 and 105 both become "H" level, causing the outlet A of the display mode discrimination circuit 8 to change to "H". Therefore, the output of NOR gate 55 always becomes "L", thus allowing electrical current from a battery 21 to always flow through the transistor 58 to the selected display element. Thus it is being lighted on continuously.

It is to be noted that since in this embodiment the display element is driven to light on and off repeatedly with the same frequency as that of the pulses from the oscillator circuit 57, instead of this oscillator circuit 57 use may be made of such a pulse generator as to produce pulses of different duty, or as to oscillate intermittently for a wide variety of blinking display modes are possible.

Figure 4:
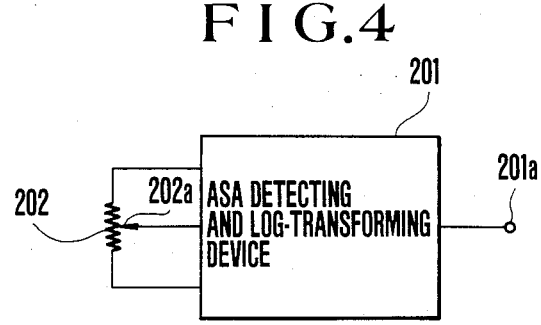
FIG. 4 is an electrical circuit diagram of the ASA selector of FIG. 1.

FIG. 4 is a practical example of the ASA selection device of FIG. 1. A variable resistor 202 has its slider 202a arranged to move in respone to an ASA selector switch (not shown). Cooperative with this is an ASA detecting and log-transformation device 201 to produce an ASA information representing the logarithm of the analog value of the film speed at an outlet 201a.

Figure 5:
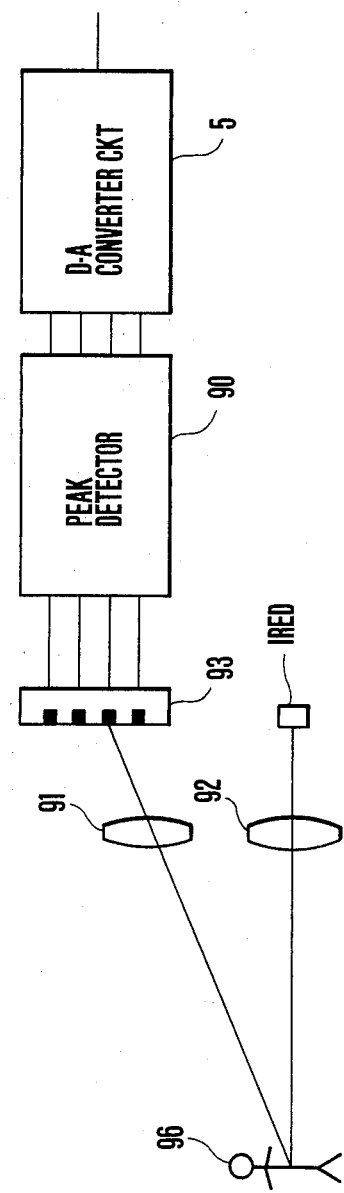
FIG. 5 is a schematic view illustrating the distance measuring device of FIG. 1.

FIG. 5 illustrates a practical example of construction of parts of the distance measuring device 3 of FIG. 1. Infrared light from an energized diode IRED is projected through a lens 92 onto an object 96. The reflected light from this object passes through a collection lens 91 to enter an array of photo-sensitive elements 93. The outputs from the photo-sensitive elements are applied to a peak discrimination device 90 having an output in the form of an digital value proportional to the measured distance. And this output is transformed to be measured distance information in the form of an analog value proportional to the logarithm of the object distance by the D-A converter circuit 5.

Figure 6:
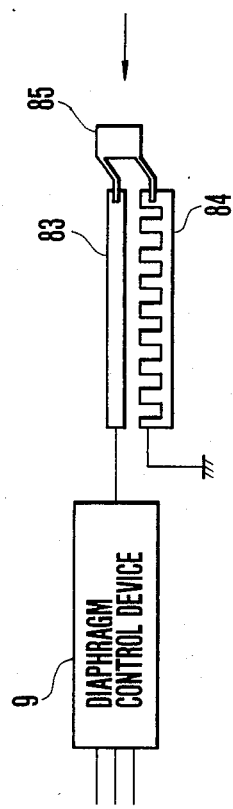
FIG. 6 is a schematic view illustrating the diaphragm control device of FIG. 1.

FIG. 6 is a practical example of construction of parts of the diaphragm control device 9 of FIG. 1. A slider contact 85 is arranged to cooperate with the diaphragm and to move on both a track 83 and a comb teeth-shaped track 84, while simultaneously sending pulses to the diaphragm control device 9. The diaphragm control device 9 comprises the diaphragm control signal from the aperture stop discrimination device 19 with the pulses from the slider 85, and tracks 83 and 84 to control the operation of the diaphragm.

Figure 7:
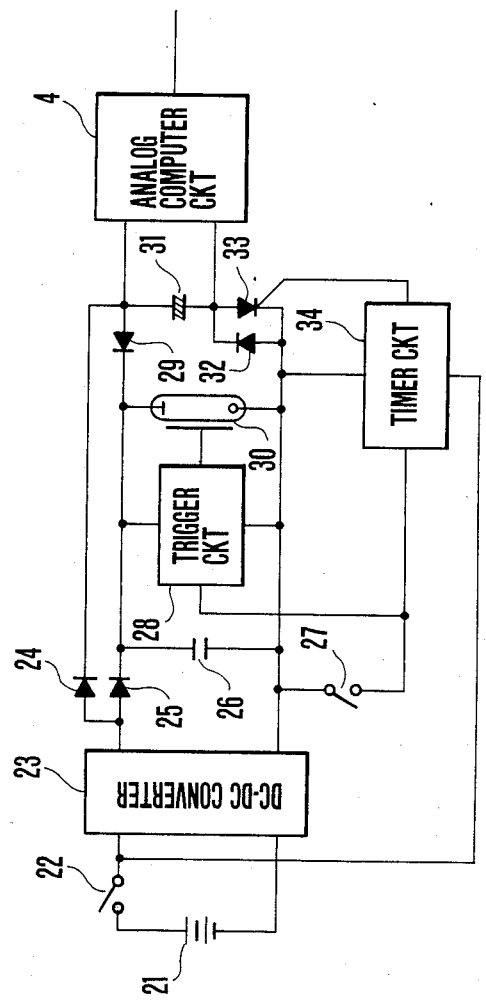
FIG. 7 is an electrical circuit diagram of the strobe device of FIG. 1.

FIG. 7 illustrates a practical example of the strobe circuit 2 of FIG. 1. This strobe circuit 2 is, as will be described in more detail below, so designed that a main capacitor 31 is not necessarily fully charged but to a relatively low level at which the firing possibility starts being assured so that as the voltage on the main capacitor 31 rises from that level, a relatively wide range of guide numbers "GNos" can be obtained.

A strobe switch 22 when closed connects an electrical power source or battery 21 to a DC-DC converter 23 of which the output is high in voltage. A condenser 26 for discharging capacitor 31 is of small capacitance and is charged to the high voltage in a short time prior to charging of the main capacitor 31. A timer circuit 34 responsive to closure of the strobe switch 22 starts counting time and upon termination of duration of a prescribed time interval produces an actuating signal which is applied to the gate of an SCR33, thereby it is turned on. When this SCR33 turns on, charging of the main capacitor 31 through a diode 24 starts. It is to be noted that the timer circuit 34 is so formed as to return to the initial state when a trigger switch 27 closes. A trigger circuit 28 of known construction responsive to closure of the trigger switch 27 excites a xenon tube 30. Diodes 29 and 32 control charging and discharging of the main capacitor 31.

The operation of the strobe circuit of such construction is as follows.

The strobe switch 22 is first turned on to charge the condenser 26 to the high voltage of the DC-DC converter 23 through the diode 25. After the prescribed time from the closure of switch 22 has passed, the timer circuit 34 turns on the SCR33, and the main capacitor 31 starts being charged.

Now assuming that the closure of the trigger switch 27 occurs before charging of the main capacitor 31 is completed, or when the voltage of charge is relatively low, then the xenon tube 30 is excited by the trigger output of circuit 28 and the charge on the condenser 26 which has been charged to, and maintained at a relatively high level by the diodes 25 and 29 is discharged through the xenon tube 30. At a point in time that the voltage stored on the main capacitor 31 has reached an equal level to the voltage on the condenser 26, the main capacitor 31 starts to be discharged through the diodes 29 and 32 to the xenon tube 30 while the condenser 26 being simultaneously discharged thereto. After the discharging has been completed, since the timer circuit 34 is already returned to the initial state by the closure of the trigger switch 27, the SCR33 is OFF.

As in the above, since the condenser 26 is fully charged in a relatively short time to allow the xenon tube 30 for starting to fire at that voltage of charge, and since the main capacitor 31 has a relatively large capacitance, it is made possible to fire the xenon tube 30 with the voltage of charge of a wide range and to obtain a wide range of amounts of flash light or "GNo".

As has been described above, according to the present invention, the flash unit is so constructed that a relatively wide range of guide numbers can be obtained, and the display of the object distance and the display of when charging of the main capacitor is completed are presented in such a combined form that detection of the completion of charging is controlled by the guide number depending upon the object distance. This enables the camera to make a flash exposure setting quickly as the object distance is so short. Therefore, there is no need for the photographer to wait for a long time until the completion of charging is indicated in the display as in the prior art. This gives rise to advantages that the shutter chance is hardly missed, and an exposure can be swiftly taken, and further that thanks to the shortening of the time necessary to establish a flash exposure setting depending upon the object distance, the consumption of electrical energy which would be otherwise unnecessary can be as lowered as possible.

Also in the present invention, the object distance and the state of charging of the flash unit are displayed by a common device and, therefore, there is no need to use an additional display of complicated structure. By changing the mode of display when in flash photography, informations which allow the photographer to operate the camera with selection of a wide variety of flash exposures can be given. Since most of the photographic situations which may be encountered with the necessity of using the flash unit are with subjects at short distances from the camera, it is expected that the opportunity of relying on the above-described features will be very frequent.

It is to be noted that the distance display of the present invention is not confined to that obtained by using the distance information from the automatic distance measuring device, but includes other forms of display, for example, a display obtained by using the manual focusing device, and that the display element itself is not always necessarily LED, but may be of liquid crystal.

What we claim:

1. A camera comprising:
    a strobe device having a main capacitor and arranged for producing signals representing at least three stages of variation of a voltage level to which a main capacitor is charged;
    film speed input means for setting the speed of a film used in said camera;
    an auto-focus device for producing a distance signal representing how far away from said camera an object lies;
    computing means for computing an exposure value from a signal from said film speed input means, a signal representing the voltage level to which the main capacitor of said strobe device is charged, and the signal from said auto-focus device and finding out whether or not the exposure value for the object is proper for flash photography; and
    display means for displaying the distance signal of said auto-focus device upon detection of a proper exposure value by the output of said computing means.

2. A camera according to claim 1, wherein said computing means includes deriving means for deriving an aperture value of the photographic lens from the signal of said film speed unit means, said signal representing the level of charge stored on the main capacitor of said strobe device and the distance signal of said auto-focus device;
    first comparing means for comparing the fully open aperture value of the photographic lens with an aperture value derived from said deriving means;
    second comparing means for comparing an aperture value smaller by one step than the fully open aperture value of the photographic lens with an aperture value derived by said deriving means; and
    means, when in shooting, responsive to judgement of a proper exposure for the object of the outputs of said first comparing means for producing a first signal; responsive to judgement of a one-step-under exposure for the object for producing a second signal, and responsive to judgement of an underexposure in excess of more than one step for the object for producing a third signal.

3. A camera according to claim 2, wherein said means for displaying the output of said computing means and for displaying the distance signal of said auto-focus device includes:
    indicating means for indicating distance zones; and
    light-emitting means positioned adjacent to said indicating means to be turned on by an AND operation of the output of said computing means and the output of said auto-focus device.

4. A camera according to claim 3, wherein the first signal of said computing means is a signal for actuating said light-emitting means to light, and the second signal is a signal for turning said light-emitting means on and off, and the third signal is a signal for inhibiting lighting of said light-emitting means.

5. A camera according to claim 2, wherein said means for displaying the output of said computing means and also displaying the distance signal of said auto-focus device includes:
    at least two indicating means corresponding to respective individual distance zones of the object distance which is divided into at least two distance zones for indicating the respective distance zones;
    at least two light-emitting means each provided adjacent to respective said indicating means; and
    indication control means for driving said light-emitting means by an AND operation of the output signal of said computing means and the output of said auto-focus device.

6. A camera comprising:
    a strobe device for producing signals representing at least three levels of charge stored on a main capacitor;
    film speed input means for setting the speed of a film used in said camera;
    an auto-focus device for producing a distance signal representing how far from said camera an object lies;
    computing means for computing from a signal of said film speed input means, a signal representing the level of charge stored on the main capacitor of said strobe device and the distance signal of said auto-focus device, whether or not a proper exposure for the object results with stroboscopic photography;
    means for displaying the distance signal of said auto-focus device upon determination of a proper exposure by said computing means; and means for prohibiting a release actuation upon said computing means detecting that the object cannot be photographed.

7. A camera as in claim 6, wherein said computing means includes deriving means for deriving an aperture value of the photographic lens from the signal of said film speed input means, said signal representing the level of charge stored on the main capacitor of said strobe device and the distance signal of said auto-focus device.

8. A camera as in claim 7, wherein said means for displaying the output of said computing means and for displaying the distance signal of said auto-focus device includes:
indicating means for indicating distance zones; and
light-emitting means positioned adjacent to said indicating means to be turned on by an AND operation of the output of said computing means and the output of said auto-focus device.

9. A camera as in claim 8, wherein the first signal of said computing means is a signal for actuating said light-emitting means to light, and the second signal is a signal for turning said light-emitting means on and off, and the third signal is a signal for inhibiting lighting of said light-emitting means.

10. A camera as in claim 7, wherein said means for displaying the output of said computing means and also displaying the distance signal of said auto-focus device includes:
at least two indicating means corresponding to respective individual distance zones of the object distance which is divided into at least two distance zones for indicating the respective distance zones;
at least two light-emitting means each provided adjacent to respective said indicating means; and
indication control means for driving said light-emitting means by an AND operation of the output signal of said computing means and the output of said auto-focus device.

11. A camera as in claim 10, wherein the first signal of said computing means is a signal for actuating said light-emitting means to light, and the second signal is a signal for turning said light-emitting means on and off, and the third signal is a signal for inhibiting lighting of said light-emitting means.

12. A camera according to claim 1 or 6, wherein said auto-focus device discriminates in which zone the object is present as the range of object distances is divided into at least three zones.

13. A camera according to claim 12, wherein said strobe device can fire even when the level of charge stored on the main capacitor is low.

14. A camera according to claim 1 or 6, wherein said computing means comprises aperture information deriving means and a comparator for comparing said aperture information with a fully open aperture information of a photographic lens.

15. A camera according to claim 14, wherein said computing means performs analog computation.

16. A camera according to claim 14, wherein said strobe device can fire even when the level of charge stored on the main capacitor is low.

17. A camera according to claim 1 or 6, wherein said strobe device can fire even when the level of charge stored on the main capacitor is low.

18. A camera according to claim 1 or 6, wherein said strobe device and said film speed input means each produce a logarithmic value.

19. A camera comprising:
a strobe device for producing signals representing at least three stages of variation of the level of charge stored on a main capacitor and capable of firing in at least two of said three stages of the charge level;
film speed input means for setting the speed of a film used in said camera;
an auto-focus device for producing an output signal representing how far away from said camera an object lies;
computing means for receiving a signal of said film speed input means, a signal representing the level of charge on the main capacitor of said strobe device and the distance signal of said auto-focus device for computing whether or not an exposure for the object is proper with stroboscopic photography; and
display means for displaying the distance signal of said auto-focus device when said computing means discriminates a proper exposure is to be obtained.

20. A camera system, comprising:
a strobe device having a main capacitor and arranged for producing signals representing at least three stages of variation of a voltage level to which a main capacitor is charged;
an auto-focus device for producing a distance signal representing how far away from said camera an object lies;
computing means for computing an exposure value from a signal representing the voltage level to which the main capacitor of said strobe device is charged and the distance signal from said auto-focus device, and for finding whether or not the exposure value for the object is proper for flash photography; and
display means for displaying the distance signal of said auto-focus device upon detection of a proper exposure value by the output of said computing means.

* * * * *